United States Patent

[11] 3,590,540

| [72] | Inventors | Richard C. Johnson<br>Dansville, N.Y.;<br>John M. Connell, Mountain Lake, N.J. |
|---|---|---|
| [21] | Appl. No. | 757,301 |
| [22] | Filed | Sept. 4, 1968 |
| [45] | Patented | July 6, 1971 |
| [73] | Assignee | Foster Wheeler Corporation<br>Livingston, N.J.<br>Continuation of application Ser. No. 716,126, Mar. 26, 1968, now abandoned, which is a continuation-in-part of application Ser. No. 468,819, July 1, 1965, now Patent No. 3,375,628. |

[54] PREFABRICATED LAMINATED INSULATED WALL PANELS
10 Claims, 17 Drawing Figs.

[52] U.S. Cl. .................................................. 52/309,
52/269, 138/151, 52/417, 52/466, 52/622
[51] Int. Cl. ........................................................ E04c 2/22,
E04b 1/80
[50] Field of Search .......................................... 52/309,
404, 416, 417, 267—269, 465, 466, 470, 471, 509;
138/151

[56] References Cited
UNITED STATES PATENTS

| 2,160,009 | 5/1939 | Walker | 138/151 X |
|---|---|---|---|
| 2,338,801 | 1/1944 | Callan | 138/151 |
| 2,778,759 | 1/1957 | Stephens et al. | 138/156 |
| 2,874,652 | 2/1959 | Wilson | 52/465 X |
| 3,016,999 | 1/1962 | Glasoe, Jr. | 52/267 X |
| 3,163,265 | 12/1964 | Waite | 52/268 X |
| 3,375,628 | 4/1968 | Connell et al. | 52/309 |

FOREIGN PATENTS

| 1,443,172 | 5/1966 | France | 52/309 |

Primary Examiner—Frank L. Abbott
Attorneys—John Maier, III, Marvin A. Naigur and Constantine A. Michalos ABSTRACT: Prefabricated insulated wall panels formed from overlying layers of heat resistant materials. The panels are capable of being assembled in abutting relation on the outer surface of a metallic enclosure. The panels have an inner fibrous insulation layer of materials such as asbestos, glass fiber, mineral wool, aluminum silicate fibers or felt secured together with inorganic binders such as bentonite, portland cement or high temperature calcium aluminate cements or an organic binder such as phenolic or latex. The insulation layer has a compressive strength sufficient to afford a suitable working surface. A heat-resistant thermosetting layer formed from an organic adhesive with a base of neoprene, rubber, silicone, or resin adhesive is applied to the insulation layer and bonds a reinforced resin laminate layer formed from polyester, phenolic, or epoxy resin, with glass fiber or fibrous asbestos. The panel joints have bonding strips of several types and configurations securing the resin laminate layer.

INVENTORS
JOHN M. CONNELL
RICHARD C. JOHNSON

ATTORNEY

PATENTED JUL 6 1971
3,590,540
SHEET 2 OF 3
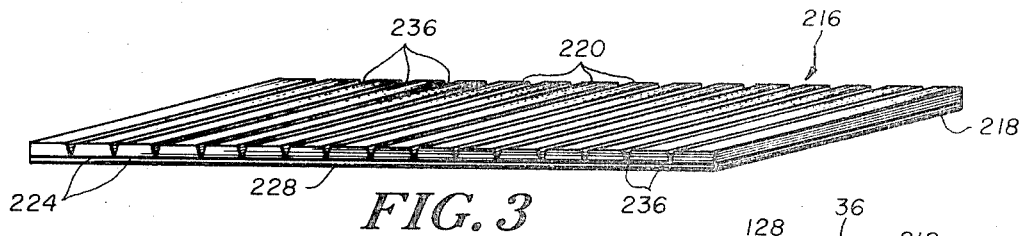
FIG. 3
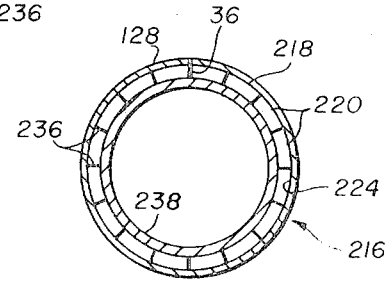
FIG. 4
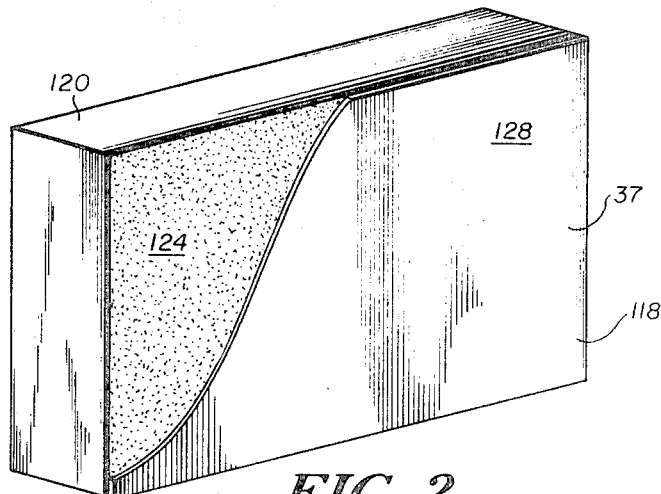
FIG. 2
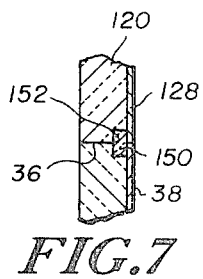
FIG. 7
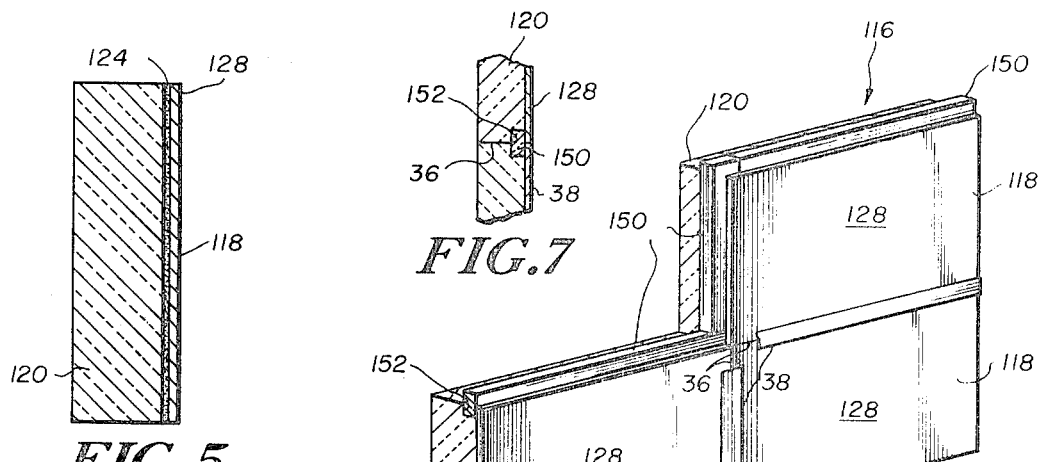
FIG. 5
FIG. 6
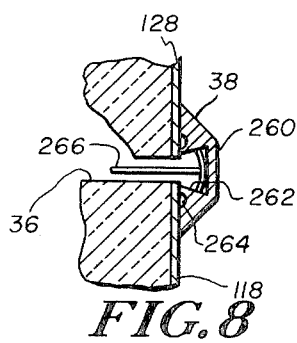
FIG. 8
INVENTORS
JOHN M. CONNELL
RICHARD C. JOHNSON
BY
ATTORNEY

INVENTORS
JOHN M. CONNELL
RICHARD C. JOHNSON

ATTORNEY

PREFABRICATED LAMINATED INSULATED WALL PANELS

CROSS REFERENCE TO RELATED APPLICATIONS

The instant application is a continuation of applicants' copending application Ser. No. 716,126 filed Mar. 26, 1968, for Laminated Insulated Wall, (now abandoned) which in turn is a continuation-in-part of copending application Ser. No. 468,819 jointly filed by applicants on July 1, 1965 for Insulated Wall Construction for Heated Surfaces, now U.S. Letters Pat. No. 3,375,628.

BACKGROUND OF THE INVENTION

The present invention provides for the prefabrication of laminated insulated modular components or wall panels which may be subsequently assembled to produce an insulated wall construction for heated metallic surfaces of the type including steam generator fin-tube walls, boiler water wall skin casings or metallic enclosures which contain hot gases as described in U.S. Letters Pat. No. 3,375,628. The components of the panels embody advantageous properties, such as compressibility of the fibrous insulation, thermosetting of the outer resin layer which is bonded to the insulation layer, and tensile strength and modulus of elasticity of the outer laminate of reinforced resin which is sufficient to compensate for stresses induced by thermal expansion of the heated surface. Also, the laminate panels of the present invention are held together by bonding means such as strips which are secured either by adhesive or mechanical means.

An object of this invention is to provide prefabricated insulated wall panels that can be assembled into a wall construction for enclosing heated metallic surfaces. The wall panels are capable of accommodating the expansion and contraction of heated surfaces without rupture of the individual laminate panels or the jointure between the panels. Thus, the stresses are uniformly distributed throughout the wall construction.

Another object of this invention is to provide prefabricated laminate wall panels that can be assembled into an insulated wall construction which is weatherproof, strong and resists gouging or scraping.

SUMMARY OF THE INVENTION

In accordance with an illustrative embodiment demonstrating features and advantages of the present invention, there is provided prefabricated insulated wall panels capable of being assembled against the surface of a heated metallic enclosure. The panels comprise an inner fibrous insulation layer formed from a heat resistant material having a compressibility of at least 15 percent under a load of substantially 5 pounds per square inch, a heat resistant thermosetting resin layer or an intermediate adhesive coating, overlying the fibrous insulation layer, and an outer reinforced resin laminated layer overlying the thermosetting resin layer and having a tensile strength of more than 5,000 p.s.i. and a modulus of elasticity of less than about $3.5 \times 10^6$. Accordingly, the elasticity of the outer reinforced resin layer and the compressibility of the insulation layer is sufficient to compensate for thermal expansion and contraction of the metallic enclosure. The panels are capable of being secured to the metallic enclosure in abutting relation with the inner fibrous insulation layer of each of the panels contacting the outer surface of the metallic enclosure.

BRIEF DESCRIPTION OF THE DRAWINGS

The invention and advantages thereof will become more apparent upon consideration of the following specification and accompanying drawings, in which:

FIG. 2 is an enlarged perspective view of a laminate panel in accordance with another embodiment of the invention with portions broken away to show the bonding coating;

FIG. 3 is a perspective view of a wall panel construction having laminate panels similar to FIG. 2, but adapted for assembly onto cylindrical surfaces, with the combined wall panel shown prior to being assembled onto the cylinder;

FIG. 4 is a transverse section through a cylindrical pipe on which there is mounted the wall panel construction of FIG. 3;

FIG. 5 is a transverse sectional view of the wall panel construction shown in FIG. 2;

FIG. 6 is a perspective view of another embodiment of a laminate panel similar to the panel of FIG. 5, but showing a reinforcement bar arrangement and the laminate panels assembled into a wall construction;

FIG. 7 is a transverse sectional view through a portion of the panels shown in FIG. 6;

FIG. 8 is a transverse sectional view of a laminate panel construction similar to the panel of FIG. 2 in which extruded bonding means are provided;

DESCRIPTION OF THE PREFERRED EMBODIMENTS

Figure 1:
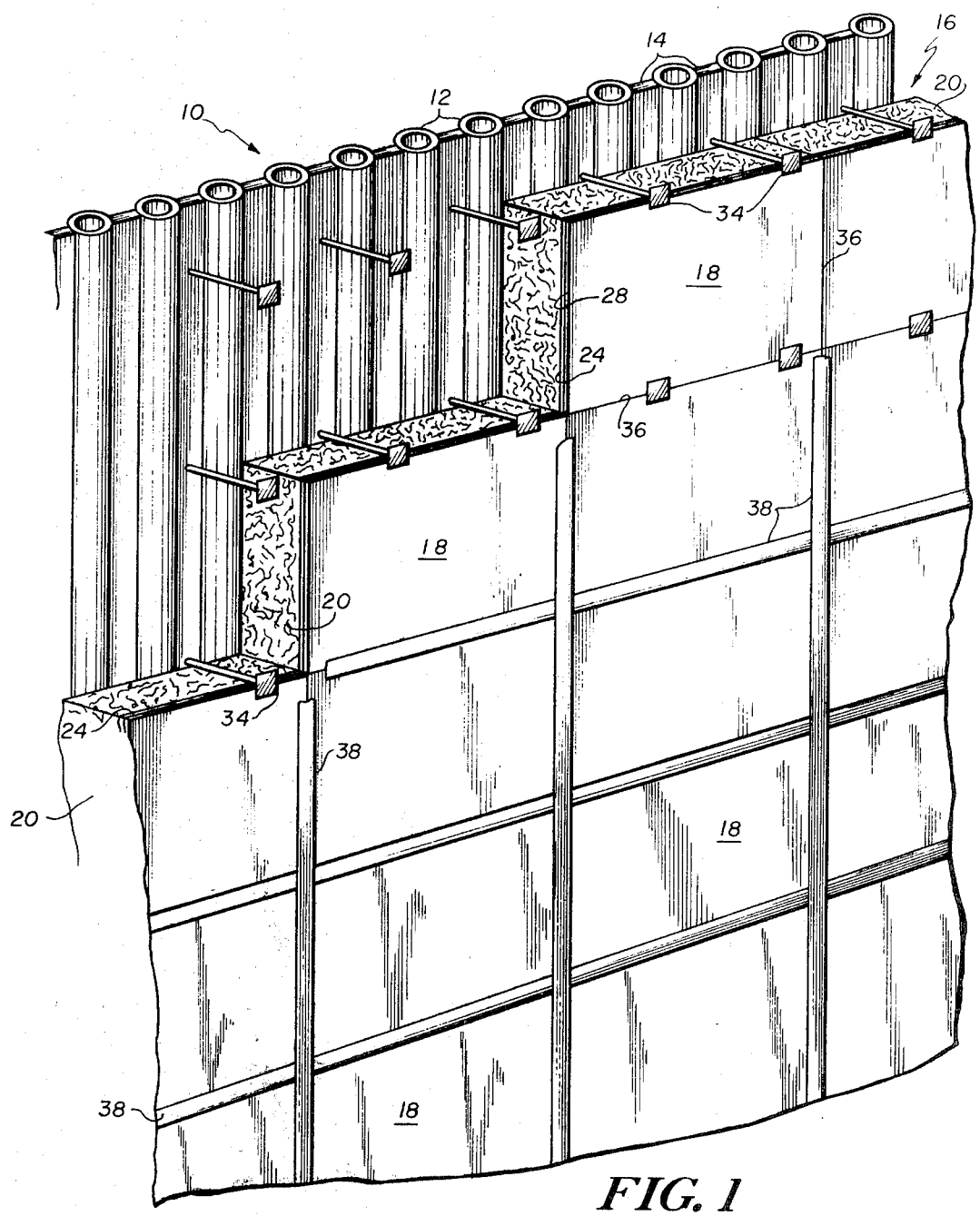
FIG. 1 is a perspective view of a plurality of prefabricated panels assembled into an insulated wall construction according to an embodiment of the present invention.

As shown in the drawings, the outer surface of a heated metallic enclosure such as a steam generator wall 10, formed from parallel tubes 12 connected by intermediate fins 14, provides a gastight construction or enclosure for a steam generator fin-tube pressurized chamber.

With reference to FIG. 1, in accordance with the present invention there is provided a combined-panel wall 16 of individual prefabricated laminate panels 18 which are attached to the outer surface of steam generator wall 10. The laminate panels 18 comprise an inner fibrous insulation layer 20, a heat-resistant thermosetting layer 24, and an outer reinforced resin laminate layer 28. The thermosetting layer 24 is coextensively disposed between insulation layer 20 and resin laminate layer 28, and serves as a means of bonding together layers 20 and 28.

The fibrous insulation layer 20 is formed from material of low conductivity such as asbestos, fiber glass, mineral wool, aluminum silicate fibers, or felt which are secured together with an inorganic binder such as bentonite, Portland cement, or high temperature calcium aluminate cements or an organic binder such as phenolic or latex. The thickness of insulation layer 20 may vary from one eighth inch to greater thicknesses dependent on a given setting. An important characteristic of the fibrous insulation layer 20 is that it be formed from resilient material having a high enough compressive strength to afford a suitable working surface which will prevent compressive failure of the insulation. The compressibility of the material forming the fibrous insulation layer 20 should preferably be at least 15 percent under a load of 5 pounds per square inch. As best shown in FIG. 1, the thermosetting layer 24 is bonded to, and reinforced in part, by the fibers of insulation layer 20. The thermosetting layer 24 is formed from an organic adhesive with a base of neoprene, rubber, silicone, or resin adhesive. The reinforced resin laminate layer 28 is formed from a fiber glass reinforced resin or an inorganic material such as sodium silicate. The reinforced resin laminate layer 28 must have a tensile strength of more than 5,000 p.s.i. and a modulus of elasticity of less than $3.5 \times 10^6$. The modulus of elasticity of resin laminate layer 28 and the compressibility of the fibrous insulation layer 20 are sufficient to compensate for thermal expansion and contraction of the metallic enclosure and/or structural members associated with the wall, such as doors, piping, insulation and laminate anchors or supports. The resin laminate layer 28 is fabricated from polyester, phenolic, or epoxy resin, with fiber glass reinforcement or fibrous asbestos or other fillers. The preforming of the insulated wall construction 16 is preferably fabricated from assembling individual laminate panels 18, having typical dimensions such as 2×3 feet, or 4×8 feet.

As shown in FIG. 1, the prefabricated laminate panels 18 are held to steam generator wall 10 by means of flat-head anchors 34. The prefabricated laminate panels 18 are assembled to steam generator wall 10 in abutting relation and form jointures 36 between the panels 18 which are adjacent to each other. Bonding means 38 formed from material similar to that or resin laminate layer 28, are secured along jointures 36.

In FIGS. 2 and 3 there is illustrated a further embodiment of the invention in which corresponding parts have been designated by the same reference numerals as part of a "100" series. In this form of the invention a combined panel wall 116, as shown in FIG. 6, is assembled from laminate panels 118. The laminate panel 118 comprises a fibrous insulation layer 120 the outer surface of which is sprayed with an adhesive coating 124, and a reinforced resin laminate layer 128. The fibrous insulation layer 120 is bonded to resin laminate layer 128 by means of the adhesive coating 124 which is absorbed into the outer surface of insulation layer 120. The adhesive coating 124 is preferably formed from epoxy cement or an organic cement. The layers 120 and 128 are fabricated from materials which are respectively similar to, and have the same physical properties as, fibrous insulation layer 20, and resin laminate layer 28.

Turning to FIGS. 6 and 7, the insulated wall construction 116 is shown assembled by means of reinforcement bars 150 which are positioned between adjoining laminate panels 118. The fibrous layer 120 is formed with cutout channels 152 which are overlapped by a portion of resin laminate layer 128, such that reinforcement bars 150 can be accommodated and enclosed when the laminate panels 118 are brought into adjoining relationship. When the reinforcement bars 150 have been positioned in the spaces formed by pairs of adjoining channels 152, it is possible to apply an epoxy cement and bonding tapes 38 are secured along the outer surface of layer 128 at the jointures 36. The reinforcement bars 150 also act as a means of preventing radiation from passing through the jointures 36.

The laminate panels 118 are shown in a modified form in FIGS. 3 and 4, for use in connection with the insulation of cylindrical structures, in which corresponding parts have been designated by the same reference numerals as part of a "200" series. Accordingly, FIG. 3 shows a combined panel wall 216, in sheet form, integrally formed from laminate panels 218. The sheet form of panel construction 216 comprises a series of coextensive fibrous layers 220, bonded by means of an adhesive coating 224 to a continuous sheet of resin laminate layer 228. The laminate panels 218 are formed from materials which correspond to the material of laminate panels 118, and have the same physical properties thereof. Between the panels 218 which adjoin one another, are rectangular-shape jointure channels 236, which allow for the wall sheet construction 216 of FIG. 2 to be secured around a cylindrical pipe 238, as shown in FIG. 4. Since the jointure channels 236 are located between the individual laminate panels 218, it is possible to bring the adjacent edges of fibrous layers 220, on adjoining panels 218, into abutting contact, when assembling wall sheet construction 216 to cylindrical pipe 238.

Figure 9:
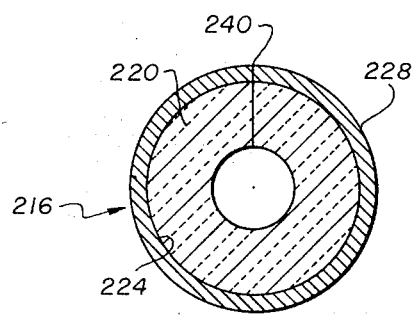
FIG. 9 is a transverse sectional view of another embodiment of a panel construction for use with cylindrical pipes.
Figure 10:
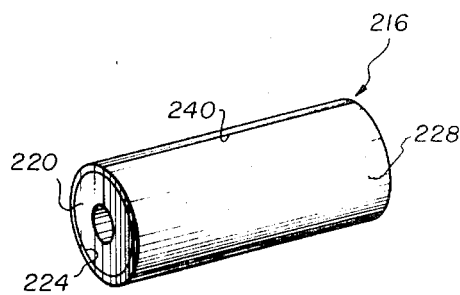
FIG. 10 is a perspective view of the panel shown in FIG. 9.

In FIGS. 9 and 10 a cylindrical wall sheet construction 216 is shown having a premolded annular shape, rather than the flat configuration of FIG. 2. Accordingly, the premolded wall sheet 216 is formed with a slit opening 240 which extends through fibrous insulation layer 220, coating 224, and resin laminate layer 228. Due to the resiliency of cylindrical wall sheet construction 216, it is possible to spread apart slit opening 240 for assembly onto cylindrical pipe 238.

In FIGS. 8 and 11 through 17, various embodiments of bonding means 38 are shown in detail. Thus, FIG. 8 shows bonding means 38 in the form of a preformed extrusion 260 having a frustoconical-shaped central channel 262 and a pair of grooves 264 on opposite sides of channel 262. The preformed extrusions 260 are used to assemble the laminate panels 118 into the combined panel wall 116 by depositing a bonding agent such as an epoxy cement or inorganic cement in grooves 264. In this manner, the preformed extrusion 260 can be secured to the outer surface of resin laminate layer 128 along the jointures 36. The flat head anchors 34 are replaced by arcuate-head anchors 266 which can be snap fitted into channel 262 for mounting the combined panel wall 116 onto the steam generator wall 10.

Figure 11:
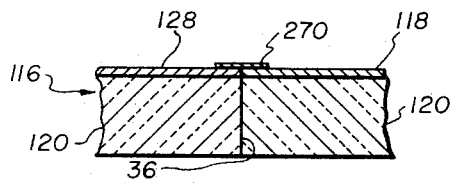
FIG. 11 is a transverse sectional view of assembled laminate panels similar in construction to the panel shown in FIG. 2, with the panels held in abutting relation by a strip member.

As best shown in FIG. 11, the bonding means 38 is in the form of a strip member 270 which is secured to the outer surface of resin laminate layer 128 along the jointures 36. It is preferable to use an epoxy or inorganic cement to secure strip member 270 to laminate layer 128. The material of strip members 270 is the same as that of resin laminate layer 128.

Figure 12:
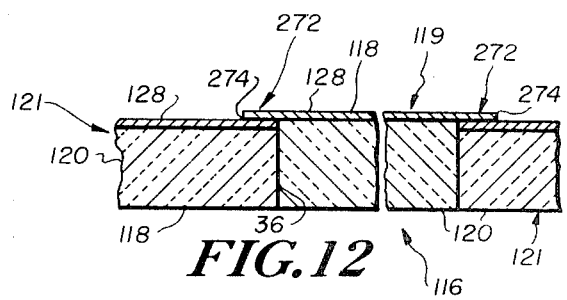
FIG. 12 is a transverse sectional view similar to FIG. 11, but with the panels held in abutting relation by means of a lap joint.

In FIG. 12, the laminate panels 118 are assembled by means of lap joints 272. The laminate panels 118 of FIG. 12 include a lap panel 119 and flush panel 121. The lap panel 119 is formed with edge portions 274 on laminate layer 128 which extend over the edges of insulation layer 120. The flush panel 121 is substantially identical in configuration to laminate panel 118 of FIG. 2, but the flush panel 121 is formed with an overall thickness which is equal to the thickness of insulation layer 120 of lap panel 119. This dimensioning of panels 119 and 121 allows for a uniform surface, on the edge of wall panel 116, as shown in FIG. 12. By surrounding each lap panel 119 with four flush panels 121, it is possible to achieve an integrally formed combine panel wall 116 by applying a bonding agent such as epoxy cement to lap joints 272.

Figure 13:
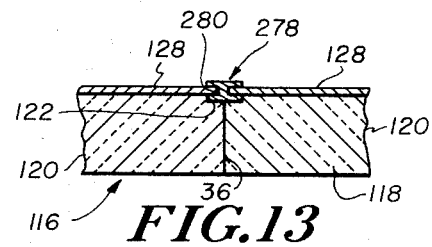
FIG. 13 is a transverse sectional view similar to FIG. 11, but with the panels held in abutting relation by means of a double-butt strip member.

Turning to FIG. 13, there is shown the laminate panels 118 which are joined together by means of a double-butt strip 278. The fibrous insulation layer 120 is provided with a cutout channel 122 for accommodating butt strip 78, and the outer edge of laminate layer 128 overlies channel 122. Accordingly, the butt strip 278 is formed with an H-shaped cross section with opposing notches 280. To assemble laminate panels 118 with the butt strips 278, the base portions of butt strips 278 are mounted in cutout channels 122 and the edges of laminate layer 128 are positioned in the notches 280. In this manner, an epoxy cement can be used for joining together the panels 118.

Figure 14:
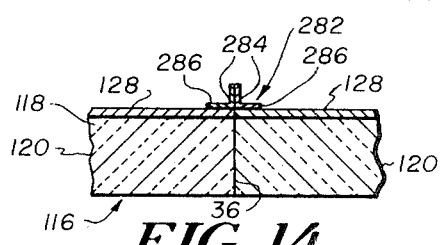
FIG. 14 is a transverse sectional view similar to FIG. 11, but with the panels held in abutting relation by means of preformed angle strip members.

Referring now to FIG. 14, there is shown preformed angle strips 282 for assembling the laminate panels 118 into combined panel wall 116. The angle strip 282 has an L-shape cross section and includes a horizontal arm 284, integrally formed with a vertical arm 286. The laminate panels 118 are assembled by mounting pairs of angle strips along the edges of abutting laminate panels 118. Thus, for each pair of angle strips 282, the horizontal arms 284 are bonded along the surface edge of laminate layer 128 and the vertical arms 286 are bonded together. It is preferable to use an epoxy-type cement for bonding the angle strips 282 together, as well as joining strips 282 to laminate panels 118.

Figure 15:
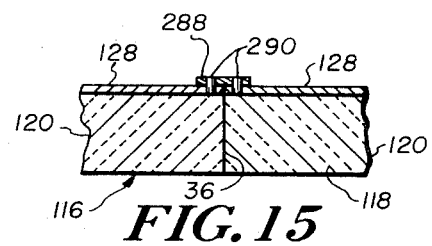
FIG. 15 is a transverse sectional view similar to FIG. 11, but with the panels held in abutting relation by means of a rivetted strip member.

In FIG. 15 the laminate panels 118 are held in abutting relation by means of a rivetted single strip member 288. The single strip member 288 is mechanically bonded along jointure 36 by means of a pair of rivets 290.

Figure 16:
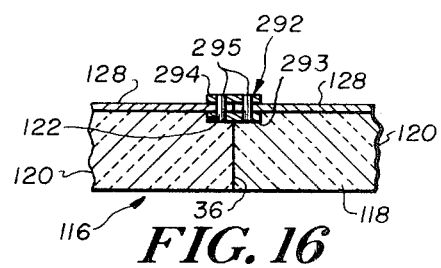
FIG. 16 is a transverse sectional view similar to FIG. 11, but with the panels held in abutting relation by means of rivetted double strip member.

With regard to FIG. 16, there is shown a rivetted double strip member 292, which includes a lower strip 293 and an upper strip 294. To assemble the laminate panels 118 by means of double strip member 292, the lower strip 293 is positioned in cutout channel 122 beneath resin laminate layer 128 and the upper strip 294 is coextensively positioned above lower strip 293 along the outer surface of resin laminate layer 128. A pair of rivets 295 are inserted through the upper strip 294, laminate layer 128 and lower strip 293, to mechanically bond laminate panel 118.

Figure 17:
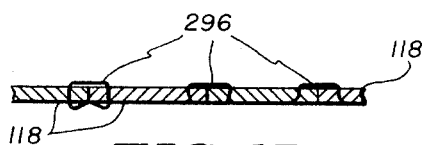
FIG. 17 is a transverse sectional view similar to FIG. 11, but with the panels held in abutting relation by means of staples.

Turning to FIG. 17, the panels 118 are held in abutting relation by means of staples 296. Thus, a mechanical bond is established by inserting the staples 296 through the panels 118 which adjoin each other.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. Prefabricated panels capable of being assembled into an insulated wall construction for a heated metallic enclosure comprising: an inner fibrous insulation layer formed from a heat resistant material having a compressibility of at least 15 percent under a load of substantially 5 pounds per square inch, a heat resistant thermosetting resin layer overlying said fibrous insulation layer, and an outer reinforced resin laminate layer overlying said thermosetting resin layer and having a tensile strength of more than 5,000 p.s.i. and of a modulus of elasticity less than about $3.5 \times 10^6$ such that the elasticity of said outer reinforced resin layer and compressibility of said insulation layer is sufficient to compensate for thermal expansion and contraction of said metallic enclosure, said panels being capable of being secured to said metallic enclosure in abutting relation with said inner fibrous insulation layer of each of said panels contacting the outer surface of said metallic enclosure.

2. Prefabricated panels according to claim 1, in which jointures are formed between said panels which are in abutting relation, and means disposed along said jointures for continuously connecting said insulated wall construction.

3. Prefabricated panels according to claim 1, in which said thermosetting resin layer is reinforced by the fibers of said fibrous insulation layer and said thermosetting resin layer is coextensively positioned on the exposed side of said fibrous insulation layer.

4. Prefabricated panels according to claim 1, in which said thermosetting resin layer is reinforced by the fibers of the fibrous insulation layer, said thermosetting resin layer covering the exposed side of said fibrous insulation layer and said reinforced resin laminate layer applied over said thermosetting resin layer thereby forming said laminate panels with a resiliency selected to compensate for thermal expansion of said metallic enclosure.

5. Prefabricated panels according to claim 1, in which said fibrous insulation layer, said thermosetting resin layer and said resin laminate layer are formed into a concentric cylindrical wall configuration.

6. Prefabricated panels according to claim 1, in which said thermosetting resin layer and said resin laminate layer are formed from a polyester resin and said fibrous insulation layer is formed from a material of the class consisting of fibers of asbestos, glass, mineral wool, and aluminum silicate, together with a binder of the class consisting of calcium aluminate, Portland cement, phenolic and latex.

7. Prefabricated panels according to claim 1, in which said panels are secured on the outer surfaces of said metallic enclosure with said fibrous insulation layer, thermosetting resin layer, and resin laminate layer of each of said panels, positioned in juxtaposed relation to form jointures between said panels.

8. Prefabricated panels according to claim 7 in which bonding means extend along the length of said jointures for joining said panels together.

9. Prefabricated panels according to claim 8, in which said bonding means are formed from strips secured to said panels at said jointures and said strips fabricated from material having physical properties similar to the physical properties of said reinforced resin laminate layer.

10. Prefabricated panels according to claim 9, in which said strips are formed with a uniform cross section.